Sept. 19, 1967 R. M. DESCHAMPS ET AL 3,343,058
STORAGE BATTERIES AND CELLS
Filed Aug. 6, 1965 3 Sheets-Sheet 1

INVENTORS
ROBERT MARCEL DESCHAMPS
CHARLES DUFOUR
BY
ATTORNEYS

Sept. 19, 1967  R. M. DESCHAMPS ET AL  3,343,058
STORAGE BATTERIES AND CELLS
Filed Aug. 6, 1965  3 Sheets-Sheet 2

INVENTORS
ROBERT MARCEL DESCHAMPS
CHARLES DUFOUR
BY
ATTORNEYS

United States Patent Office 3,343,058
Patented Sept. 19, 1967

3,343,058
STORAGE BATTERIES AND CELLS
Robert Marcel Deschamps and Charles Dufour, both of Paris, France, assignors to Societe des Accumulateurs Fixes et de Traction (Societe Anonyme), Seine, France, a company of France
Filed Aug. 6, 1965, Ser. No. 477,694
Claims priority, application France, Aug. 12, 1964, 984,956
9 Claims. (Cl. 320—17)

ABSTRACT OF THE DISCLOSURE

Protective system for a storage cell or a battery of such cells to prevent harmful effects thereto, both of cell reversal and of overcharge comprising connecting separate tunnel type diodes or separate groups of series connected tunnel type diodes of selected types in shunt across each cell's terminals, the tunnel diodes being conductive to negative potentials and also conductive to positive potentials above a selected value and being substantially non-conductive at positive potentials below the selected value.

This invention relates to storage batteries and more particularly to an arrangement for preventing damage to the individual cells thereof upon reversal or from overcharge.

As an improvement in the use and operation of sealed storage cells, more particularly in batteries comprising several sealed cells, it has already been proposed for example in U.S. Patent No. 2,624,033 to use diodes suitably biased by the cells themselves permanently connected or shunted across the terminals of individual cells, so that the diodes become conductive when the particular cell is reversed. For this purpose, the diode shunting of each cell is connected so that the current can flow from the negative terminal to the positive terminal of the cell. Thus the cell itself, by means of the algebraic value of its voltage, controls the making and breaking of the circuit constituted by the diode. In this way, the cell-diode system always lets the current flow in the direction of discharge. As long as the discharge is normal, i.e., as long as the cell provides current to the outer circuit, the said cell allows and ensures the flow of current through the whole battery. If the said particular cell ceases providing current i.e., if it becomes completely discharged and if due to this fact one at least of its poles is reversed which causes the reversal of its terminal voltage, the diode, reversely biased, becomes conductive and then through the shunting diode the current from the other cells continues to flow through the whole battery without, however, flowing through the said particular cell but instead through its shunting diode. The particular cell is therefore withdrawn from the harmful electrochemical exchange which take place during its reversal that could cause its destruction by accumulation therein of gases, or deterioration of the active materials of its electrodes.

This cell-diode system has, however, only one possibility of action, namely, that occurring only when negative voltages appear at particular cell terminals of the battery.

One object and feature of the invention is to provide an improved cell-diode or non-linear conductor system which, while able to act in the above-described way during the cell reversal, also has a further possibility of action, namely, of letting the current flow through the shunting diode when the terminal voltage of the cell achieves a given positive value.

Another object and feature of the invention is to provide an operating range for the cell diode or non-linear conductor system in which substantially no current flows through the diode or non-linear conductive systems connected across the cells of a battery between two sharply defined points, one starting when the terminal voltage of the cell across which it is connected becomes negative and the other when this terminal voltage reaches a given positive value.

Another object and feature of the invention is to give a voltage value to the diode system for which the second current flow action is through the diode system and caused by the same value as that reached either at the end of charge of the cell it shunts or as that reached for a given part of the said charge.

Still another object and feature of the invention is to provide if necessary at least two cell shunting diodes according to the invention connected across each cell of a battery and disposed in the same direction in order to increase the value of the positive bias voltage for which said diodes become conductive.

Other objects and features of the invention will become apparent from the following specification and the accompanying drawings forming a part hereof, wherein.

Figure 1:
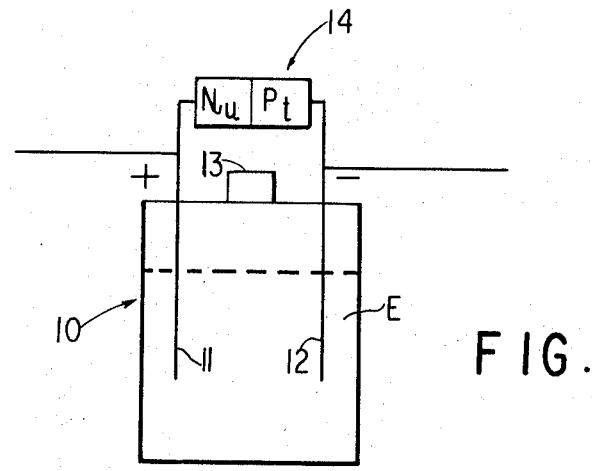
FIG. 1 is a diagrammatic view of an individual cell equipped with shunting diode systems embodying the invention.

The manner of connecting the diode systems across an individual cell of a battery is similar to that described in U.S. Patent No. 2,624,033. There, the connections are shown in FIGURE 1, wherein 10 denotes a storage cell;
11 is the positive electrode thereof;
12 is its negative electrode;
13 is the closure of the cell 10 which may be either sealed or open type, this closure being for instance a containing valve (not shown);
14 is a diode embodying the invention, the base $P_t$ of which is connected to the negative terminal, i.e. to electrode 12 and the other terminal $N_u$ of said diode is connected to the positive terminal of the cell, i.e. to electrode 11.

E is the electrolyte which can either be immobilized, free-flowing, without excess or with excess as the case may be.

The diodes, particularly useful in practicing the invention, are so-called tunnel diodes of high power type capable of passing substantial currents. Such uni-tunnel diodes are known having been produced by Centre de Recherches de C.G.E. Marcoussis, France. These tunnel diodes instead of being of the point contact type of conventional backward rectifiers which latter permit passage only of negligible amounts of signal current are of an area contact type capable of transmitting high currents that may exceed hundreds of amperes. In the production of said C.G.E. tunnel diodes the junction at the interface is achieved by a vacuum evaporation followed by a fast alloyage cycle which provides a large junction area between the positive $P_t$ material and negative $N_u$ material of the C.G.E. tunnel diode.

Figure 2:
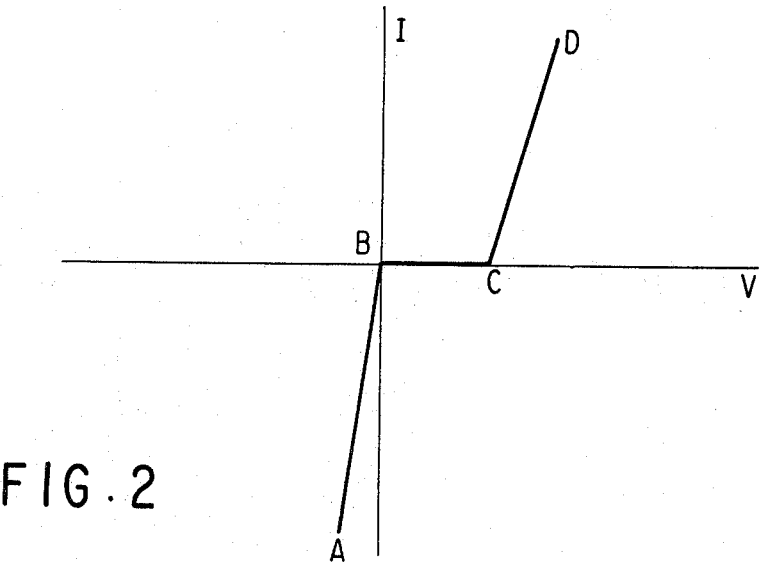
FIG. 2 is a graph illustrating general characteristics of tunnel diodes useful in practicing the invention.

According to the invention, the characteristic curve of such a tunnel diode which is to be used in the cell-diode system according to this invention, is represented on FIGURE 2. As seen, there are three distinct portions in this characteristic curve.

Curve portion AB for which the tunnel diode D permits the current to flow freely for a negative bias voltage, i.e., when the terminal voltage of the cell 10 becomes negative. In such event, the result is withdrawal of the cell with the parallelly connected said diode from the electrochemical action of that current which would normally flow through it during its reversal e.g., when the cell is connected with others to form part of a battery.

Curve portion BC for which the tunnel diode D is substantially non-conductive and permits little or no current flow through it. This portion BC lies in the range of normal cell voltages during use and in this way, self-discharge of the cell 10 linked to the diode D through the said diode is prevented during normal cell discharge or when idle.

Curve portion CD for which the tunnel diode D' becomes quite conductive and occurs when a given positive voltage is reached. The value of this voltage can be selected to be that of the normal charged cell voltage or any desired fraction thereof. Thus, when this voltage is achieved, the diode again becomes conductive and charging current will be by-passed through it. Thus, the cell can be withdrawn automatically from the action of the charging current at the end of the charge and during the overcharge, said current then being harmful to the cell.

The mode of application of the invention will be more readily understood when the following details are considered.

In practice, the characteristic curve ABCD of FIG. 2, as hereinabove described, can be obtained by using special types of tunnel diodes of silicon or germanium. In such tunnel diodes the portion BC corresponding to the range in which the current cannot flow freely through the diode is obtained by joining the two separated portions AB and CD along a wavy line to give the true characteristic wave as shown in FIG. 3.

Figure 3:
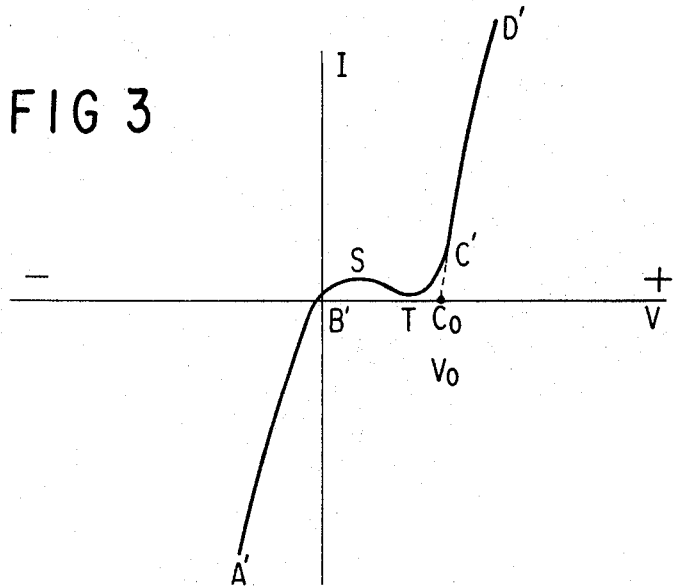
FIG. 3 is a similar graph illustrating characteristic conduction curves of such diodes.

In this FIG. 3, three distinct portions can be seen:

Portion A'B' for which the tunnel diode permits the current to freely flow during negative voltages.

Portion C'D' which is substantially linear for which the tunnel diode permits the current to flow freely from a given positive voltage $V_0$, the value of which is given by the intersection point $C_0$ of a projection of the linear portion C'D' with the voltage axis.

Portion B'ST between 0 and said positive voltage $V_0$ during which the tunnel diode permits a very low current flow for some positive values of voltage lower than $V_0$ and greater than 0.

It should be noted that the projection of the curve portion C'D which intersects the voltage axis at point $C_0$ essentially depends on the nature of the main substances constituting the tunnel diode and does not substantially depend on the doping with foreign substances. The value of voltage at point $C_0$ is about 0.7 volt for a silicon diode and 0.5 volt for a germanium diode.

On the contrary, the slope of portion A'B can be controlled and made greater or less. The greater this slope is in absolute value, the smaller is the voltage for which the tunnel diode will be biased to permit a current flow of I amps. therethrough. On the other hand, the smaller the slope of part A'B is, still in absolute value, the flatter is the portion B'T of the characteristic curve. As a consequence, if the permissible leakage current is to be very small, line A'B should have as small a slope as possible. But as a corollary, the value of the negative voltage for which a given current will flow through the tunnel diode will be higher.

Thus, there exists a choice between a high value of the reversal current for a low bias voltage, and a leakage current that is reduced as much as possible.

Figure 4:
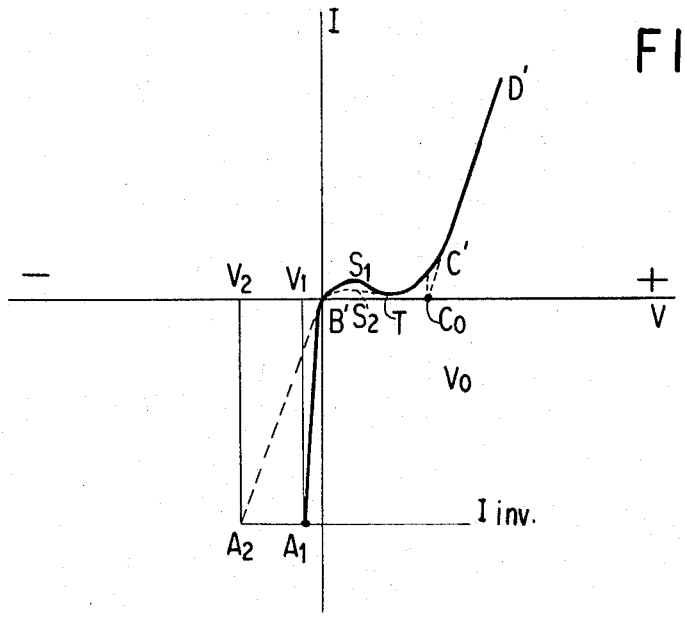
FIG. 4 is a similar graph of characteristic curves of such diodes and the manner of their use in practicing the invention.

Various possible arrangements of characteristic curves for tunnel diodes give the best solutions for any particular case are shown in FIG. 4. Therein, two arrangements of characteristic curves, namely $A_1B'S_1TC'D'$ and $A_2B'S_2TC'D$ are shown. The two curves actually differ only by the varying slope of $A_1B'$ and $A_2B'$, the slope and position of portion C'D' of these curves remaining substantially the same.

Thus, if for a particular use, summit $S_2$ of the curve is required to be very flat, i.e., to provide minimal leakage current, it is required that portion $A_2B'$ must slope away substantially from the current axis I. If the portion $A_1B'$ is more nearly vertical, the summit $S_1$ will have a greater leakage current ordinate.

Thus, a tunnel diode system having a characteristic curve $A_1B'S_1C'D'$ should preferably be adopted if it is desired that the maximum transmission current flow through the tunnel diode for as small a negative voltage as possible. On the contrary, if it is desired that the leakage current be very much reduced and minimal during idle battery periods or during the first part of its charge, a tunnel diode system having the characteristic curve $A_2B'S_2C'D'$ should be used with it.

It is also possible to control the slope of $A_1B$ or $A_2B$ using a suitable tunnel diode system so that an advantageous value of the negative bias voltage is obtained, in relation to the intensity of the current flowing through the tunnel diode system.

For this purpose, high power tunnel diodes should be used, i.e, those through which substantial currents can flow, e.g., large area of contact tunnel diodes such as those made by C.G.E. as above mentioned.

It is moreover to be noted that if a priori it seems more advantageous to use a uni-tunnel diode in whose characteristic curve the portion between points B' and C' is very flattened in order to reduce to a minimum the leakage currents which can flow at point S, the maximum value of such leakage current as defined by the ordinate of point S has no substantial effect except on cells already discharged to a point where its terminal voltage is lower than 1 volt. But before reaching this value, the portion of the curve defined by point T with a practically null ordinate must be passed. Thus, point T then blocks the leakage current which cannot flow through the cell of the cell-diode system which is shunted by the tunnel diode. It is then important that the point T of the tunnel diode curve be located at the cell operating voltage, which corresponds to the open circuit voltage that the cell has when it is charged.

When this is done, if the cell is discharged, that is to say if its terminal voltage becomes lower than the voltage of point T, the possible existence of a leakage current defined, for example, by the ordinate of point S has no practical signficance since the cell is then discharged.

Within the scope of the invention it is possible to vary the slope of part AB by selecting the nature of the materials of a single tunnel diode, or to utilize several similar or different series-connected tunnel diodes for a given application requiring special values of the bias voltage for which the series-connected tunnel diodes should become conductive.

The invention finds numerous applications with either open or sealed storage cells, or with either lead-acid or alkaline storage cells.

It finds an application when it is necessary to withdraw a cell from the action of reversal or of overcharge currents which could cause irreversible modifications in a state of the active materials of the cell and even, when they are the origin of substantial gas evolution, can also cause a dislocation of the conductive links in the active material in the cell electrodes.

This is, for instance, the case in lead-acid storage cells, the life of which is strongly influenced by the phenomena occurring during both overcharge and reversal. It is well known that such a cell cannot bear reversals since these cause the transformation of positive active material into negative active material and vice versa. An overcharge is also harmful for it.

Figure 5:
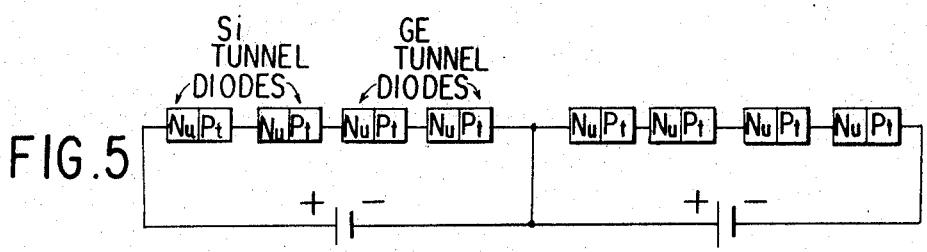
FIGS. 5, 6, 7 and 8 are circuit diagrams illustrating connections of diode systems embodying the invention applied to batteries of various types of cells.

For such a cell the overcharge begins as soon as the cell has reached a voltage of 2.4 volts. Thus, as seen in FIG. 5 for each cell of a battery of such cells, four series-connected tunnel diodes should be provided and connected in shunt or across the respective cells, two of them being silicon tunnel diodes (2×0.7=1.4 volts) and two germanium tunnel diodes (2×0.5=1.0 volt) which gives a total bias voltage of 2.4 volts above which the four series-connected diodes permit the current flow freely through them during charging, thus by-passing the cell of the battery that has become charged and preventing damage from overcharge.

Tunnel diodes with an individual characteristic curve portion A'B' having a very great slope should be used so that the sum total of the slopes of these tunnel diodes connected in series yield a satisfactory resulting line A'B'.

Figure 6:
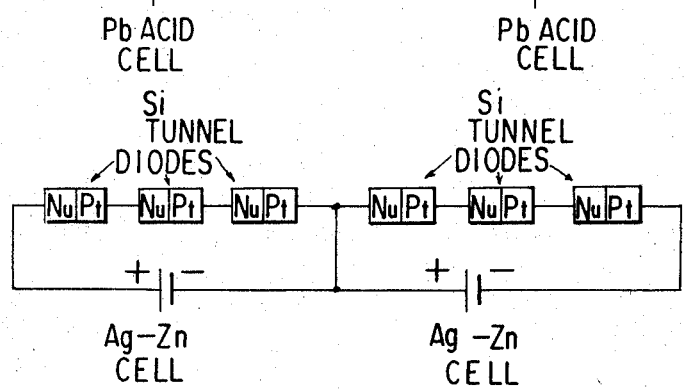

Silver-zinc cells also are known not to be capable of withstanding bad effects of a reversal, while an overcharge also is harmful to them. The end of charge voltage of these cells is about 2.1 volts, and in this case as seen in FIG. 6, for each cell of a battery of such cells, three series-connected silicon tunnel diodes (3×0.7=2.1 volts) should be connected in shunt across the respective cells so that above 2.1 volts the charging current by-passes the charged cell through the diode system shunted across it. Also, the portion A'B' of the overall characteristic curve of such series-connected tunnel diodes likewise must be chosen to obtain the desired by-passing action through the shunt diode system as soon as cell reversal begins.

Figure 7:
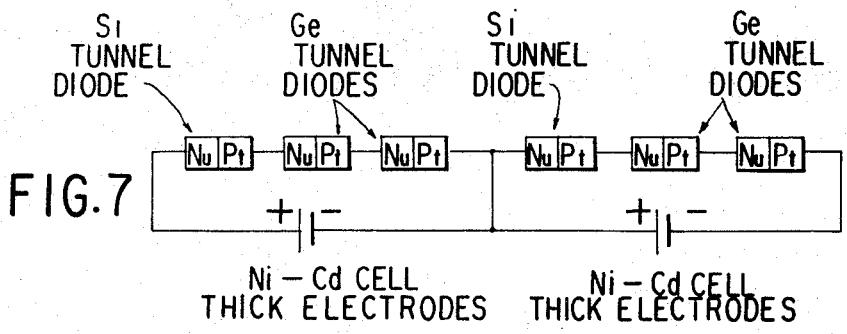

For nickel-cadmium cells of conventional type with thick electrodes, the voltage at end of charge is about 1.7 volts. Hence, as seen in FIG. 7, for each cell of a battery of such cells three series-connected, tunnel diodes should be used, one being a silicon one (1×0.7 v.=0.7 v.) and the other two germanium ones (2×0.5 v.=1 v.). These three-series-connected tunnel diode systems are connected respectively in parallel or shunt across each cell of the battery and by-pass charging current therethrough when the particular cell across which they are connected above 1.7 volts. Also, the portion A'B' of the overall characteristic curve of such tunnel diode system must be chosen to obtain by-passing action through the shunt diode system as soon as cell reversal begins in the particular cell.

Figure 8:
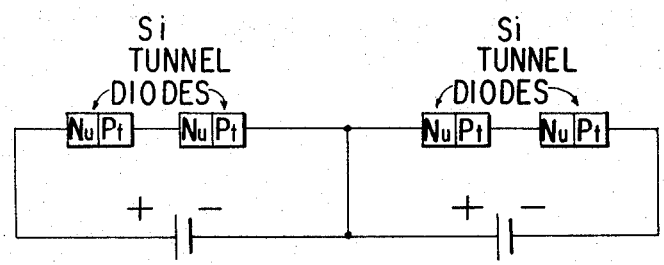

For thin electrode-nickel-cadmium cells, more particularly those provided with thin sintered electrodes, the end of charge occurs at about 1.4 v. Hence as seen in FIG. 8 for each cell of a battery of such cells, two silicon tunnel diodes (2×0.7 v.=1.4 v.) will give a bias voltage of 1.4 volts therethrough above which the charging current freely flows through the shunting series connected diodes. Here again, the slope A'B' of the overall characteristic curve must be chosen to obtain by-passing action through the shunt diode system as soon as cell reversal occurs in the particular cell.

Thus, lead-acid cells as well as alkaline cells can be withdrawn automatically by use of shunting tunnel diodes from the harmful actions of cell reversal and overcharging currents.

But the field of application as above described does not end there. It also extends to sealed cells. The described tunnel diodes shunted across cells can advantageously be used for cutting off the flow of charging current through the cell as its voltage during charging attains a positive value at which there is a risk that a dangerous pressure may build up in the cell either due to overcharge above such voltage or the cell reversal. The overcharge or reversal currents are merely by-passed at such occurrences in the corresponding shunting tunnel diodes. This is particularly useful in cell reversal. In this event, the tunnel diodes are so selected that points D' of their curves occur at said positive value and so that the slopes A'B' of their overall characteristics permit free current flow therethrough as soon as cell reversal occurs.

The invention can thus be used for obtaining safe operation as sealed cells in cells of which no means have otherwise been provided for consuming the electrolysis products thereof.

It can also be used for improving the operation of such cells when means are provided for the consumption of electrolysis products.

The invention is not limited to the given example. Equivalent means are also within its scope. More particularly, diodes of other types can be used for obtaining the desired bias voltages.

It can thus be seen that this invention provides a system, means and method for automatically protecting individual storage cells and batteries of such cells from the harmful effects of cell reversal and overcharge and is applicable equally to lead-acid or alkaline storage cells and batteries of open or sealed type whether or not equipped with other means for the consumption of products of electrolysis. Moreover, the tunnel diodes described can be replaced by other non-linear types of conductor providing similar characteristics and results.

While specific embodiments and examples have been described and shown, variations within the scope of the appended claims are possible and are contemplated. There is no intention therefore of limitation to the exact disclosure herein presented.

What is claimed is:

1. A protective system for a storage cell to prevent the harmful effects thereto of cell reversal and overcharge current comprising a separate non-linear conductor tunnel diode means connected in shunt across the cell terminals, said means each being conductive to negative potentials and also conductive to positive potentials above a selected value and being substantially non-conductive at positive potentials below said selected value.

2. A protective system for the cells of a storage battery to prevent harmful effects in each cell thereof of cell reversal or of overcharge current flow therethrough comprising a non-linear conductive tunnel diode means for each cell of the battery connected in shunt across the terminals of such cell, each said means being conductive to negative potentials upon occurrence of reversal of the cell across whose terminals it is connected, and also conductive to positive potentials above a selected value across such terminals and being substantially non-conductive at positive potentials below such selected value.

3. A protective system according to claim 1 wherein said non-linear conductor means comprises a tunnel diode capable of passing high currents when conductive.

4. A protective system according to claim 2 wherein said non-linear conductor means comprises a tunnel diode capable of passing high currents when conductive.

5. A protective system according to claim 1 wherein said non-linear conductive means comprises series-connected tunnel diodes each capable of passing high currents when conductive.

6. A protective system according to claim 2 wherein said non-linear conductive means each comprise series-connected tunnel diodes capable of passing high currents when conductive.

7. In combination a storage battery comprising a plurality of interconnected cells and a separate tunnel diode means connected across the terminals of each cell, each said means being conductive at negative reversal potentials of the cell across which it is connected and also conductive at positive potentials above a selected positive value and being non-conductive at positive potentials below said selected positive value so that on cell reversal or attainment of a state of charge of the cell that provides said selected value of positive potential at its terminals discharge or charging currents will by-pass such cell by flow through the conductive non-linear conductor means connected across it.

8. In combination according to claim 7 wherein each said tunnel diode means comprises tunnel diode means capable of passing high currents when conductive and wherein said selected value of positive potential has a limit whose value approximates the voltage of the cell at full charge across which the said diode means is connected.

9. In combination according to claim 8 wherein said tunnel diode means comprise a group of like-pole series-connected tunnel diodes.

References Cited

UNITED STATES PATENTS

| 2,624,033 | 12/1952 | Jacquier | 320—53 |
| 3,142,768 | 7/1964 | Kaufman | 307—88.5 |
| 3,148,322 | 9/1964 | Booe et al. | 320—59 X |
| 3,225,317 | 12/1965 | Yasuda et al. | 322—52 |

JOHN F. COUCH, *Primary Examiner.*

S. WEINBERG, *Assistant Examiner.*